US012428311B2

(12) United States Patent
Xu et al.

(10) Patent No.: US 12,428,311 B2
(45) Date of Patent: Sep. 30, 2025

(54) PREPARATION METHOD FOR HIGH NICKEL TERNARY PRECURSOR CAPABLE OF PREFERENTIAL GROWTH OF CRYSTAL PLANES BY ADJUSTING AND CONTROLLING ADDITION AMOUNT OF SEED CRYSTALS

(71) Applicant: JINGMEN GEM CO., LTD, Hubei (CN)

(72) Inventors: Kaihua Xu, Hubei (CN); Zhenkang Jiang, Hubei (CN); Zhou Tang, Hubei (CN); Tao Li, Hubei (CN); Xiuping Du, Hubei (CN); Liang Bai, Hubei (CN); Hua Zhang, Hubei (CN); Zhijiang Wu, Hubei (CN); Shifeng Jiang, Hubei (CN)

(73) Assignee: JINGMEN GEM CO., LTD, Hubei (CN)

( * ) Notice: Subject to any disclaimer, the term of this patent is extended or adjusted under 35 U.S.C. 154(b) by 659 days.

(21) Appl. No.: 17/789,965

(22) PCT Filed: Dec. 30, 2019

(86) PCT No.: PCT/CN2019/129742
§ 371 (c)(1),
(2) Date: Jun. 29, 2022

(87) PCT Pub. No.: WO2021/134153
PCT Pub. Date: Jul. 8, 2021

(65) Prior Publication Data
US 2023/0035993 A1 Feb. 2, 2023

(51) Int. Cl.
*C01G 53/10* (2006.01)
*C01G 45/10* (2006.01)
*C01G 51/10* (2006.01)

(52) U.S. Cl.
CPC .......... *C01G 53/10* (2013.01); *C01G 45/10* (2013.01); *C01G 51/10* (2013.01)

(58) Field of Classification Search
CPC ......... C01G 53/10; C01G 45/10; C01G 51/10
See application file for complete search history.

(56) References Cited

U.S. PATENT DOCUMENTS

2017/0309894 A1 10/2017 Hu et al.
2019/0359497 A1 11/2019 Ma et al.

FOREIGN PATENT DOCUMENTS

CN 101447547 A 6/2009
CN 106784786 A 5/2017
(Continued)

OTHER PUBLICATIONS

European Search Report issued for Application No. 19958295.8, mailed Sep. 1, 2023.
(Continued)

*Primary Examiner* — James A Fiorito
(74) *Attorney, Agent, or Firm* — Barnes & Thornburg LLP

(57) ABSTRACT

A preparation method for a high nickel ternary precursor capable of preferential growth of crystal planes by adjusting and controlling the addition amount of seed crystals. The method comprises the following steps: 1) feeding a ternary metal solution into a reaction kettle containing a first base liquid for reaction, and when the particle size reaches 1.5 to 3.0 μm, stopping the feeding, so as to obtain a seed crystal slurry; 2) simultaneously adding the ternary metal solution, a liquid alkali solution, and an ammonia solution in cocurrent flow into a growth kettle containing a second base solution for reaction, when the particle size reaches 6 to 8 μm, adding the seed crystal slurry into the reaction system, and controlling the particle size to be 9.0 to 11.0 μm by adjusting the feed rate of the seed crystal, so as to obtain the (Continued)

target object. In the preparation method, by adding seed crystals continuously, the crystal plane parameters of 001 peak in the prepared ternary precursor material is lower than the crystal plane parameters of 101 peak, facilitating the embedding of Li ions, and effectively improving the performance of a battery prepared by using the material.

10 Claims, 4 Drawing Sheets

(56) References Cited

FOREIGN PATENT DOCUMENTS

| | | |
|---|---|---|
| CN | 107342417 A | 11/2017 |
| CN | 108172822 A | 6/2018 |
| CN | 108269995 A | 7/2018 |
| CN | 108598441 A | 9/2018 |
| CN | 108706638 A | 10/2018 |
| CN | 108767248 A | 11/2018 |
| CN | 108807968 A | 11/2018 |
| CN | 109311698 A | 2/2019 |
| CN | 208889768 U | 5/2019 |
| CN | 110364714 A | 10/2019 |
| CN | 110422889 A | 11/2019 |
| JP | 2012252844 A | 12/2012 |
| JP | 2013171744 A | 9/2013 |
| JP | 2015003838 A | 1/2015 |
| WO | 2014203815 A1 | 12/2014 |
| WO | 2018015210 A1 | 1/2018 |

OTHER PUBLICATIONS

International Search Report and Written Opinion for PCT/CN2019/129742 dated Sep. 5, 2020.
Chinese Search Report prepared for China Application No. 2019800033330, mailed Mar. 4, 2023.
Japanese Office Action with English Translation issued for Application No. 2022-540713, mailed Jun. 29, 2023.

PREPARATION METHOD FOR HIGH NICKEL TERNARY PRECURSOR CAPABLE OF PREFERENTIAL GROWTH OF CRYSTAL PLANES BY ADJUSTING AND CONTROLLING ADDITION AMOUNT OF SEED CRYSTALS

CROSS REFERENCE TO RELATED APPLICATIONS

This application is a U.S. national stage application under 35 U.S.C. § 371(b) of International Application No. PCT/CN2019/129742, filed Dec. 30, 2019, the disclosure of which is hereby expressly incorporated by reference in their entirety.

TECHNICAL FIELD

The present application belongs to the technical field of preparing ternary precursors, and particularly relates to a preparation method of a high-nickel ternary precursor capable of controlling crystal face preferential growth through an addition amount of seed crystals.

BACKGROUND

In the preparing process of ternary precursors, the commonly used synthesis processes include the batch method, continuous method and batch-continuous combination application; the batch method generally has a stable process condition with no need to adjust parameters in the process, which can finish the reaction as long as the reaction is completed under one process condition; the continuous method needs to continuously adjust the process parameters in the production process to allow the balance point of the reaction to change continuously, in which the entire production process guarantees the reaction reaching a dynamic balance and maintaining continuity.

In the continuous method production of ternary precursors, when the particle size is close to the target particle size, the process parameters are usually increased or reduced in the reacting system, such as ternary flow rate, sodium hydroxide solution flow rate, ammonia flow rate, rotational speed and temperature, to enable the reaction system in growth state to generate a fluctuation through changing process parameters, thereby generating new crystal nucleus and generating new small particles; by the method of spilling over while growing, the reaction is performed continuously, and thus, the product is discharged continuously, and the production is stable; however, the high pH condition usually produces the small particles of rough morphology and poor sphericity, has difficulty in controlling the particle size, needs to adjust lots of parameters and has difficulty to be controlled accurately: additionally, for the particles produced in the high pH condition, after diffraction, the peak of 001 crystal face is higher than the peak of 101 crystal face, which does not facilitate to the insertion of lithium ions, thereby affecting the battery performance.

SUMMARY

Technical Problem

In view of the above, the present application provides a preparation method of a high-nickel ternary precursor capable of controlling crystal face preferential growth through an addition amount of seed crystals, which solves the problems caused by increasing pH for maintaining particle size distribution in the prior art, including poor morphology of small particles, poor consistency of sphericity, and the peak of the indices of crystal face 001 is higher than the peak of 101 crystal face.

Solution of Problem

Technical Solution

In order to achieve the above object, the technical solution of the present application can be achieved by that: a preparation method of a high-nickel ternary precursor capable of controlling crystal face preferential growth through an addition amount of seed crystals, and the method includes the following steps:

Step 1. adding a ternary metal solution into a reaction kettle containing a first base liquid for a coprecipitation reaction, continuously monitoring a particle size, stopping the feeding when the particle size D50 reaches 1.5-3.0 μm, so as to obtain a seed crystal slurry; and Step 2. simultaneously adding the ternary metal solution, a sodium hydroxide solution and an ammonia solution as parallel flow into a growth kettle containing a second base liquid for a coprecipitation reaction, continuously monitoring a particle size, adding the seed crystal slurry obtained in Step 1 at a constant rate into the reaction system when the particle size D50 reaches 6-8 μm, adjusting the feeding rate of the seed crystal slurry to 600-5000 g/h for controlling the particle size D50 at 9.0-11.0 μm, performing the reaction continuously and discharging the product, so as to obtain a high-nickel ternary precursor with crystal face in preferential growth.

Preferably, in the Step 1, an ammonia concentration of the first base liquid is 4-8 g/L, a temperature of the first base liquid is 40-60° C., and a pH of the first base liquid is 11.0-12.0.

Preferably, in the Step 1, a feeding rate of the ternary metal solution is 100-300 L/h.

Preferably, in the Step 1, a stirring rate is 250-350 r/min during the coprecipitation reaction.

Preferably, in the Step 2, in the Step 1, an ammonia concentration of the second base liquid is 4-10 g/L, a temperature of the second base liquid is 40-60° C., and a pH of the second base liquid is 10.5-11.5.

Preferably, in the Step 2, a feeding rate of the ternary metal solution is 250-300 L/h, a feeding rate of the sodium hydroxide solution is 50-100 L/h, and a flow rate of the ammonia solution is 20-40 L/h.

Preferably, in the Step 2, a stirring rate is 200-400 r/min during the coprecipitation reaction.

Preferably, in the Step 2, a content of the seed crystals in the seed crystal slurry added per hour is identical with a solid content of the seed crystals in the seed crystal slurry.

Preferably, in the Step 2, a mass concentration of sodium hydroxide in the sodium hydroxide solution is 30-32%, and a mass concentration of ammonia in the ammonia solution is 15-25%.

Preferably, a content of nickel in the high-nickel ternary precursor with crystal face in preferential growth obtained in the Step 2 is 80-85 mol %.

Preferably, the ternary metal solution is a nickel-cobalt-manganese ternary mixed salt solution, and in the nickel-cobalt-manganese ternary mixed salt solution, a concentration of the nickel ions is 80-85 mol %, a concentration of the cobalt ions is 10-15 mol %, and a concentration of the manganese ions is 3-7 mol %.

Beneficial Effects of the Invention

Beneficial Effects

Compared with the prior art, a reaction method of continuously adding seed crystals is used in the present application, ensuring that small seed crystals with stable morphology and sphericity are continuously added into the reaction system, so that the prepared ternary precursor has uniform morphology, good sphericity and stable particle size distribution, and the peak of the indices of crystal face 001 is lower than the peak of the indices of crystal face 101 in the ternary precursor material, which is more conducive to the insertion of lithium ions, thereby improving the performance of batteries prepared with such material effectively.

BRIEF DESCRIPTION OF DRAWINGS

Description of Drawings

Figure 1:
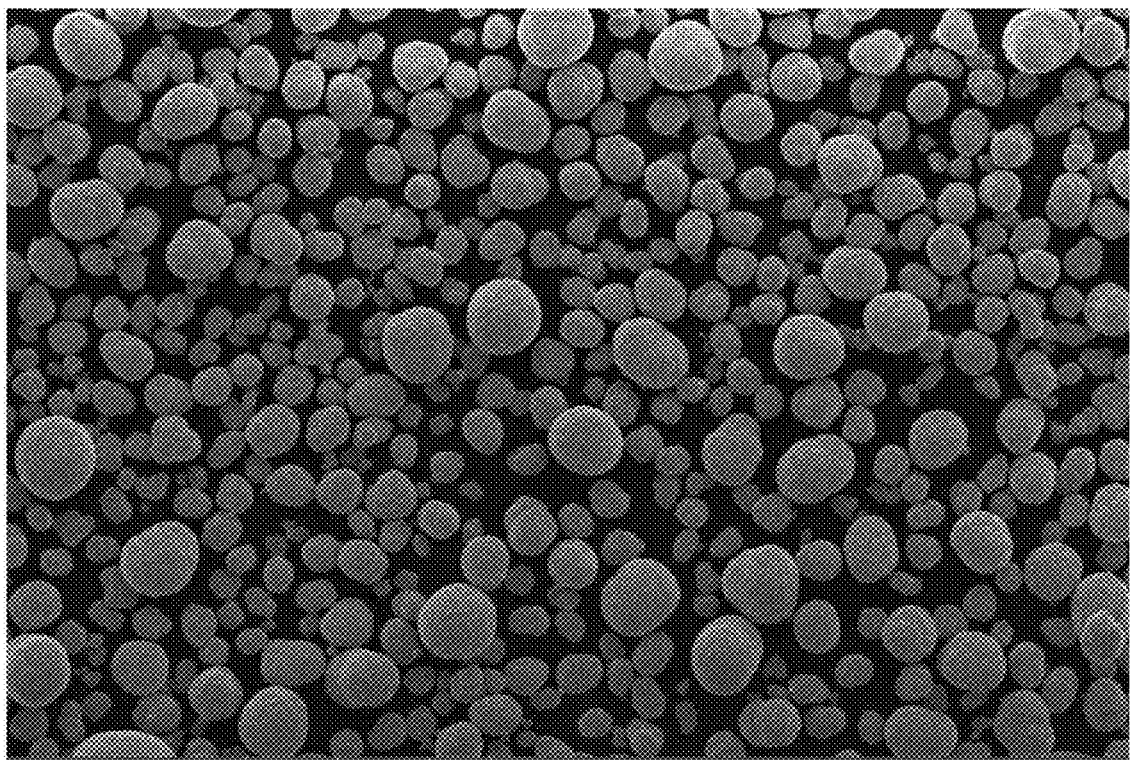
Figure 2:
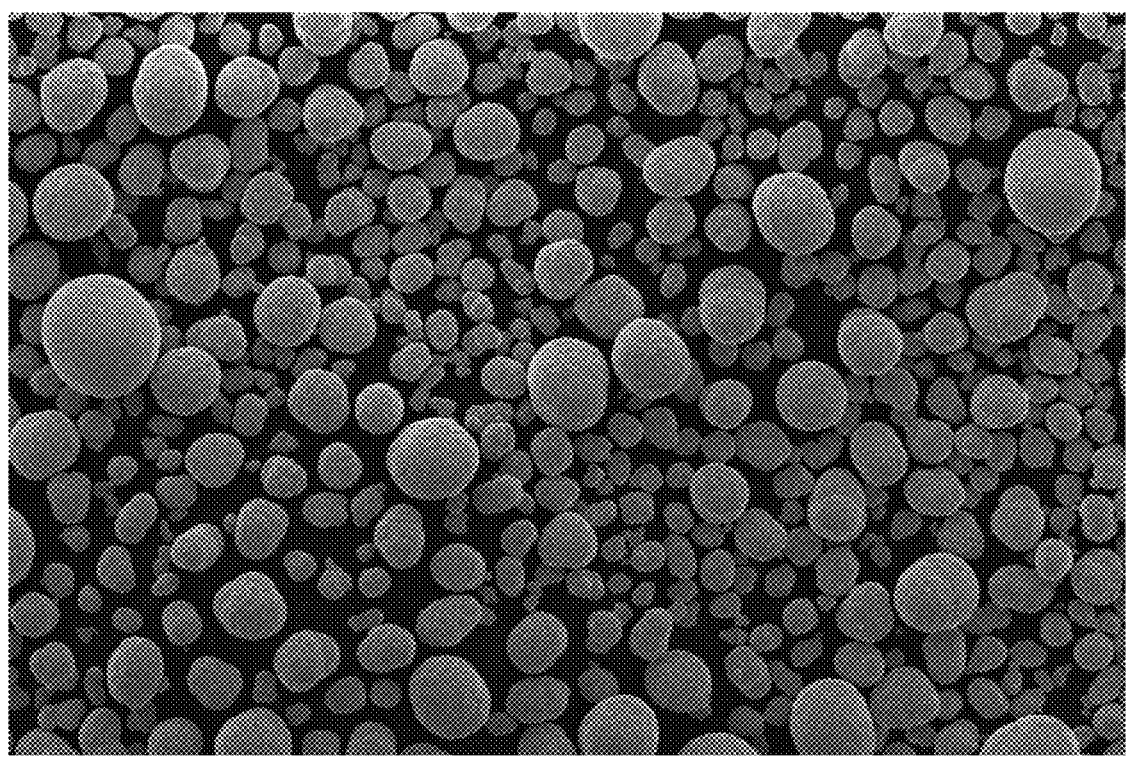
Figure 3:
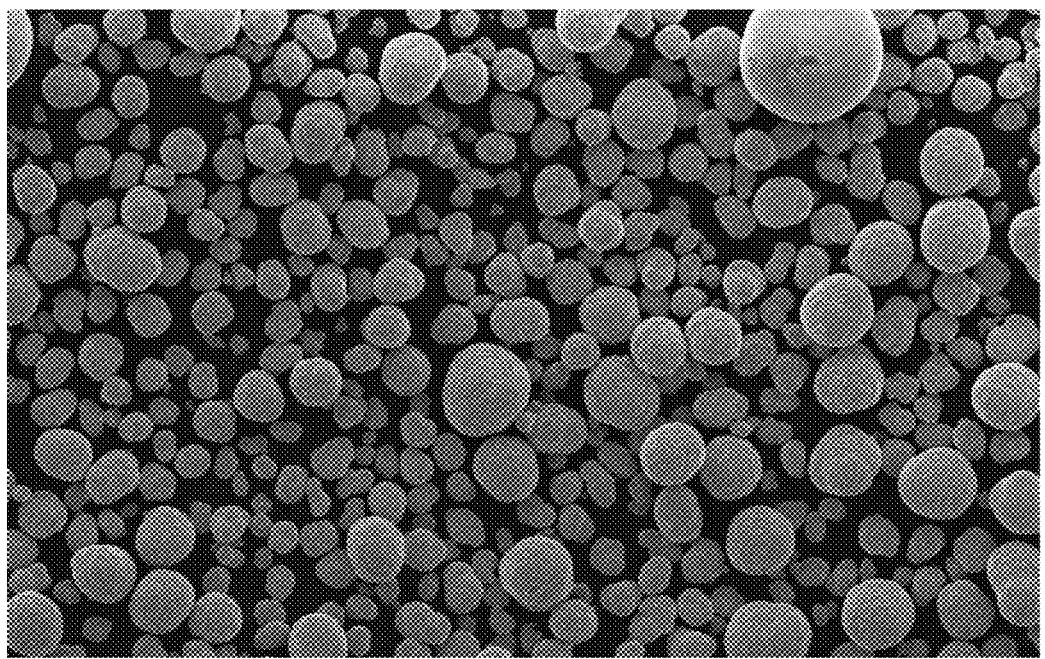
Figure 4:
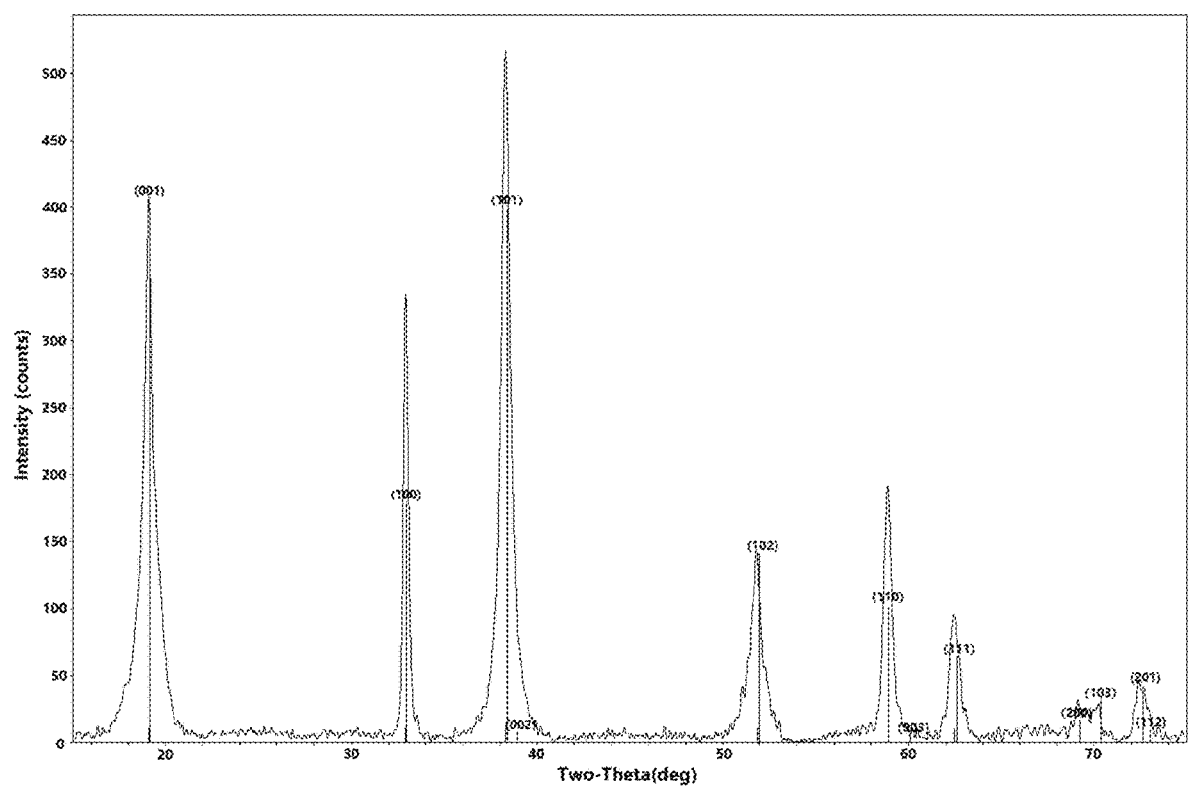
Figure 5:
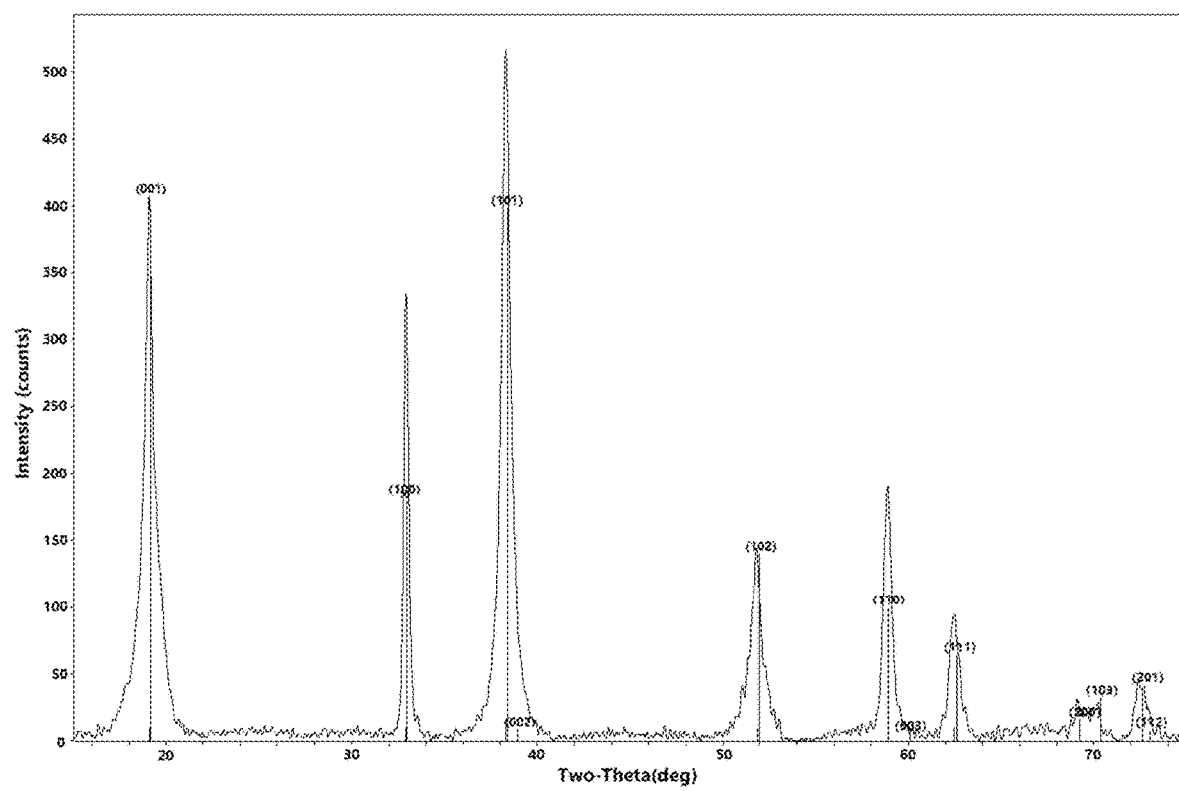
Figure 6:
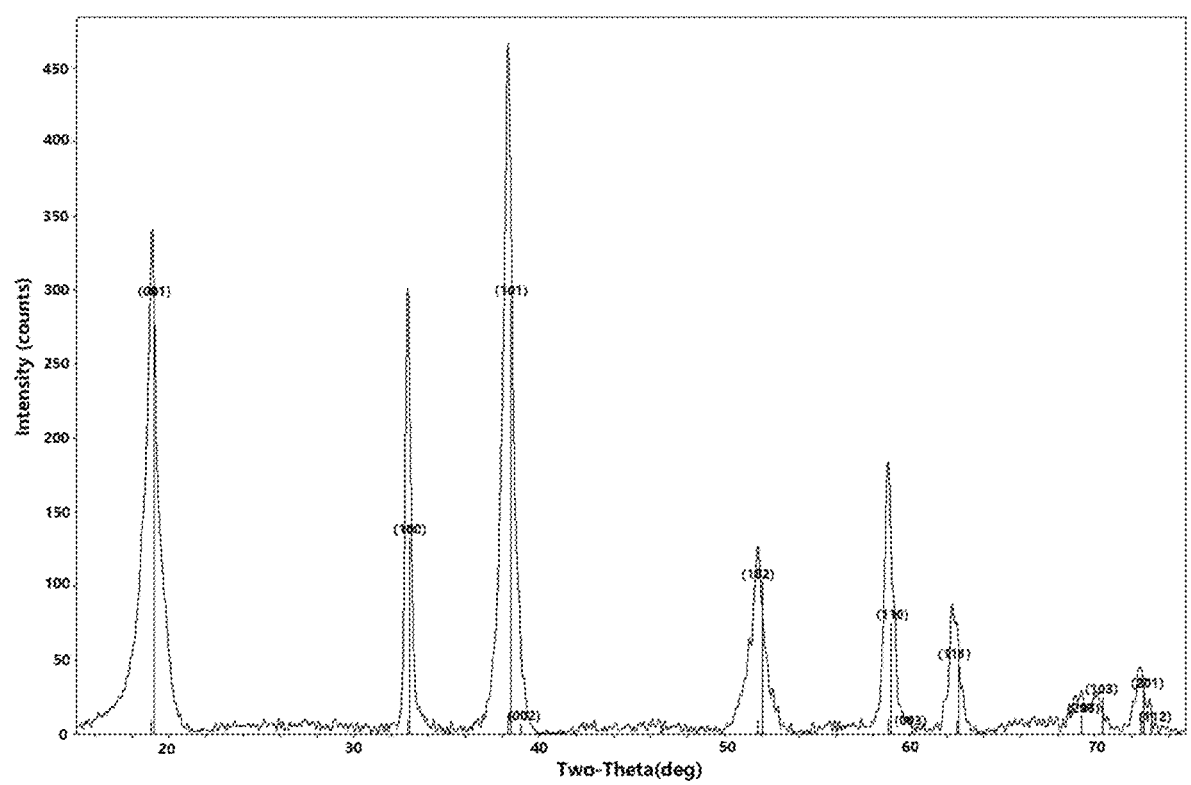

FIG. 1 is a SEM image of a high-nickel ternary precursor capable of controlling crystal face preferential growth through an addition amount of seed crystals in Example 1 of the present application;

FIG. 2 is a SEM image of a high-nickel ternary precursor capable of controlling crystal face preferential growth through an addition amount of seed crystals in Example 2 of the present application;

FIG. 3 is a SEM image of a high-nickel ternary precursor capable of controlling crystal face preferential growth through an addition amount of seed crystals in Example 3 of the present application;

FIG. 4 is an XRD pattern of a high-nickel ternary precursor capable of controlling crystal face preferential growth through an addition amount of seed crystals in Example 1 of the present application;

FIG. 5 is an XRD pattern of a high-nickel ternary precursor capable of controlling crystal face preferential growth through an addition amount of seed crystals in Example 2 of the present application;

FIG. 6 is an XRD pattern of a high-nickel ternary precursor capable of controlling crystal face preferential growth through an addition amount of seed crystals in Example 3 of the present application.

DETAILED DESCRIPTION

Optimized Embodiments of the Invention

The present application is further described in details in conjunction with specific embodiments hereinafter for a better understanding of objects, technical solutions and advantages of the present application. It should be understood that the specific embodiments described here are merely used to explain the application, but not to limit the application.

A laser particle size analyzer is used in the present application to measure a particle size of cobaltosic oxide particles during the generation process and a particle size of the finally obtained cobaltosic oxide particles. Unless otherwise specified, the chemical reagents used in examples of the present application are all available through conventional commercial channels.

A preparation method of a high-nickel ternary precursor capable of controlling crystal face preferential growth through an addition amount of seed crystals provided in an example of the present application includes the following steps:

Step 1. a nickel-cobalt-manganese ternary mixed salt solution, in which a concentration of the nickel ions was 80-85 mol %, a concentration of the cobalt ions was 10-15 mol % and a concentration of the manganese ions was 3-7 mol %, was added at a feeding rate of 100-300 L/h into a reaction kettle containing a first base liquid, of which a temperature was 40-60° C., an ammonia concentration was 4-8 g/L and a pH was 11.0-12.0, with a stirring rate of 250-350 r/min for a coprecipitation reaction; a particle size was monitored continuously; when the particle size D50 reached 1.5-3.0 μm, the feeding was stopped until the reaction was complete, and a sealed heat insulation process was performed, so as to obtain a seed crystal slurry; and Step 2. the nickel-cobalt-manganese ternary mixed salt solution, in which the concentration of the nickel ions was 80-85 mol %, the concentration of the cobalt ions was 10-15 mol % and the concentration of the manganese ions was 3-7 mol %, a sodium hydroxide solution with a mass concentration of 30-32% and an ammonia solution with a mass concentration of 15-25% were added simultaneously as parallel flow at a feeding rate of 250-300 L/h, 50-100 L/h and 20-40 L/h respectively into a growth kettle containing a second base liquid, of which a temperature was 40-60° C., an ammonia concentration was 4-10 g/L and a pH was 10.5-11.5, with a stirring rate of 200-400 r/min for a coprecipitation reaction; a particle size was monitored continuously; when the particle size D50 reached 6-8 μm, the seed crystal slurry obtained in Step 1 was added at a constant rate into the reaction system, and the feeding rate of the seed crystal slurry was adjusted to 600-5000 g/h for controlling the particle size D50 at 9.0-11.0 μm; the reaction was performed continuously and the product was discharged, so as to obtain a high-nickel ternary precursor with crystal face in preferential growth of which a nickel content was 80-85 mol %; in the step, a content of the seed crystals in the seed crystal slurry added per hour was identical with a solid content of the seed crystals in the seed crystal slurry.

Additionally, ternary metal solutions used in Step 1 and Step 2 were both the nickel-cobalt-manganese ternary mixed salt solution, wherein, a concentration of the nickel-cobalt-manganese ternary mixed salt solution was 1.8-2.2 mol/L.

Moreover, a preparation method of the first base liquid specifically included that: pure water of ⅔ volume was added into a reaction kettle and adjusted to a temperature of 40-60° C., an ammonia solution with a mass concentration of 15-25% was added into the pure water until the ammonia concentration reached 4-8 g/L, and a pH was then adjusted to 11.0-12.0 using sodium hydroxide solution with a mass concentration of 30-32%.

A preparation method of the second base liquid specifically included that: pure water of ⅔ volume was added into a production kettle and adjusted to a temperature of 40-60° C., an ammonia solution with a mass concentration of 15-25% was added into the pure water until the ammonia concentration reached 4-10 g/L, and a pH was then adjusted to 10.5-11.5 using sodium hydroxide solution with a mass concentration of 30-32%.

With the above technical solution, a reaction method of continuously adding seed crystals is used, ensuring that small seed crystals with stable morphology and sphericity are continuously added into the reaction system, so that the prepared ternary precursor has uniform morphology, good sphericity and stable particle size distribution, and the peak of the indices of crystal face 001 is lower than the peak of the indices of crystal face 101 in the ternary precursor material, which is more conducive to the insertion of lithium ions, thereby improving the performance of batteries prepared with such material effectively.

For a better understanding of the solution in the present application, a further description is given below in conjunction with specific examples.

Example 1

Nickel sulfate, cobalt sulfate and manganese sulfate were mixed and prepared into a nickel-cobalt-manganese ternary mixed solution, in which a concentration of the nickel ions was 83 mol %, a concentration of the cobalt ions was 12 mol % and a concentration of the manganese ions was 5 mol %; then, a sodium hydroxide solution with a mass concentration of 30% and an ammonia solution with a mass concentration of 20% were prepared individually.

The nickel-cobalt-manganese ternary mixed solution, in which the concentration of the nickel ions was 83 mol %, the concentration of the cobalt ions was 12 mol % and the concentration of the manganese ions was 5 mol %, was added at a feeding rate of 200 L/h into a reaction kettle containing a first base liquid, of which a temperature was 50° C., an ammonia concentration was 6 g/L and a pH was 11.5, with a stirring rate of 300 r/min for a coprecipitation reaction: a particle size was monitored continuously; when the particle size D50 reached 2 μm, the feeding was stopped until the reaction was complete, and a sealed heat insulation process was performed, so as to obtain a seed crystal slurry.

The nickel-cobalt-manganese ternary mixed solution, in which the concentration of the nickel ions was 83 mol %, the concentration of the cobalt ions was 12 mol % and the concentration of the manganese ions was 5 mol %, a sodium hydroxide solution with a mass concentration of 30% and an ammonia solution with a mass concentration of 20% were added simultaneously as parallel flow at a feeding rate of 300 L/h, 50 L/h and 30 L/h respectively into a growth kettle containing a second base liquid, of which a temperature was 50° C., an ammonia concentration was 7 g/L and a pH was 11, with a stirring rate of 300 r/min for a coprecipitation reaction; a particle size was monitored continuously; when the particle size D50 reached 5 μm, the seed crystal slurry obtained in Step 1 was added at a constant rate into the reaction system, and the feeding rate of the seed crystal slurry was adjusted to 2000 g/h for controlling the particle size D50 at 10.0 μm; the reaction was performed continuously and the product was discharged, so as to obtain a high-nickel ternary precursor with crystal face in preferential growth of which a nickel content was 82 mol %; in the process, a content of the seed crystals in the seed crystal slurry added per hour was identical with a solid content of the seed crystals in the seed crystal slurry.

Example 2

Nickel sulfate, cobalt sulfate and manganese sulfate were mixed and prepared into a nickel-cobalt-manganese ternary mixed solution, in which a concentration of the nickel ions was 80 mol %, a concentration of the cobalt ions was 10 mol % and a concentration of the manganese ions was 3 mol %; then, a sodium hydroxide solution with a mass concentration of 30% and an ammonia solution with a mass concentration of 15% were prepared individually; the nickel-cobalt-manganese ternary mixed solution, in which the concentration of the nickel ions was 80 mol %, the concentration of the cobalt ions was 10 mol % and the concentration of the manganese ions was 3 mol %, was added at a feeding rate of 100 L/h into a reaction kettle containing a first base liquid, of which a temperature was 50° C., an ammonia concentration was 6 g/L and a pH was 11, with a stirring rate of 250 r/min for a coprecipitation reaction; a particle size was monitored continuously; when the particle size D50 reached 1.5 μm, the feeding was stopped until the reaction was complete, and a sealed heat insulation process was performed, so as to obtain a seed crystal slurry.

The nickel-cobalt-manganese ternary mixed solution, in which the concentration of the nickel ions was 80 mol %, the concentration of the cobalt ions was 10 mol % and the concentration of the manganese ions was 3 mol %, a sodium hydroxide solution with a mass concentration of 30% and an ammonia solution with a mass concentration of 15% were added simultaneously as parallel flow at a feeding rate of 250 l/h, 100 L/h and 40 L/h respectively into a growth kettle containing a second base liquid, of which a temperature was 50° C., an ammonia concentration was 7 g/L and a pH was 10.5, with a stirring rate of 200 r/min for a coprecipitation reaction; a particle size was monitored continuously; when the particle size D50 reached 5.0 μm, the seed crystal slurry obtained in Step 1 was added at a constant rate into the reaction system, and the feeding rate of the seed crystal slurry was adjusted to 600 g/h for controlling the particle size D50 at 9.0 μm; the reaction was performed continuously and the product was discharged, so as to obtain a high-nickel ternary precursor with crystal face in preferential growth of which a nickel content was 80 mol %; in the process, a content of the seed crystals in the seed crystal slurry added per hour was identical with a solid content of the seed crystals in the seed crystal slurry.

Example 3

Nickel sulfate, cobalt sulfate and manganese sulfate were mixed and prepared into a nickel-cobalt-manganese ternary mixed solution, in which a concentration of the nickel ions was 85 mol %, a concentration of the cobalt ions was 15 mol % and a concentration of the manganese ions was 7 mol %; then, a sodium hydroxide solution with a mass concentration of 32% and an ammonia solution with a mass concentration of 25% were prepared individually.

The nickel-cobalt-manganese ternary mixed solution, in which the concentration of the nickel ions was 85 mol %, the concentration of the cobalt ions was 15 mol % and the concentration of the manganese ions was 7 mol %, was added at a feeding rate of 300 L/h into a reaction kettle containing a first base liquid, of which a temperature was 50° C., an ammonia concentration was 6 g/L and a pH was 12.0, with a stirring rate of 350 r/min for a coprecipitation reaction; a particle size was monitored continuously; when the particle size D50 reached 3 μm, the feeding was stopped until the reaction was complete, and a sealed heat insulation process was performed, so as to obtain a seed crystal slurry.

The nickel-cobalt-manganese ternary mixed solution, in which the concentration of the nickel ions was 85 mol %, the concentration of the cobalt ions was 15 mol % and the concentration of the manganese ions was 7 mol %, a sodium hydroxide solution with a mass concentration of 32% and an ammonia solution with a mass concentration of 25% were added simultaneously as parallel flow at a feeding rate of 350 L/h, 100 L/h and 40 L/h respectively into a growth kettle containing a second base liquid, of which a temperature was 50° C., an ammonia concentration was 7 g/L and a pH was 10.5, with a stirring rate of 400 r/min for a coprecipitation reaction; a particle size was monitored continuously; when the particle size D50 reached 8 μm, the seed crystal slurry obtained in Step 1 was added at a constant rate into the reaction system, and the feeding rate of the seed crystal slurry was adjusted to 5000 g/h for controlling the particle size D50 at 11.0 μm; the reaction was performed continuously and the product was discharged, so as to obtain a high-nickel ternary precursor with crystal face in preferential growth of which a nickel content was 85 mol %; in the process, a content of the seed crystals in the seed crystal slurry added per hour was identical with a solid content of the seed crystals in the seed crystal slurry.

In order to verify whether the ternary precursor particles prepared in these examples had uniform morphology and good sphericity, the ternary precursors obtained in Examples 1-3 were individually subjected to scanning electron microscopy characterization, as shown in FIG. 1, FIG. 2 and FIG. 3, and it can be seen from FIG. 1, FIG. 2 and FIG. 3 that the ternary precursor particles obtained in the present application have uniform morphology and good sphericity.

Additionally, in order to verify whether the indices of crystal face 001 was higher or lower than the indices of crystal face 101 in the ternary precursor crystals prepared in these examples, the ternary precursors obtained in Examples 1-3 were taken as an example and individually subjected to XRD characterization, as shown in FIG. 4, FIG. 5 and FIG. 6, and it can be seen from FIG. 4, FIG. 5 and FIG. 6 that after diffraction, the peak of 001 crystal face is lower than the peak of 101 crystal face, and the 001 crystal face and the 101 crystal face have ratios of Height and Area values within 0.7-1.1.

In conclusion, a reaction method of continuously adding seed crystals is used in the present application, ensuring that small seed crystals with stable morphology and sphericity are continuously added into the reaction system, so that the prepared ternary precursor has uniform morphology, good sphericity and stable particle size distribution, and the peak of the indices of crystal face 001 is lower than the peak of the indices of crystal face 101 in the ternary precursor material, which is more conducive to the insertion of lithium ions, thereby improving the performance of batteries prepared with such material effectively.

Although the preferred specific embodiments of the present application is described above, the protection scope of the present application is not limited to the embodiments, and it should be apparent to those skilled in the art that variations or replacements, which are obvious for those skilled in the art without departing from the technical scope disclosed in the present application, all fall within the protection scope of the present application. Accordingly, the protection scope of the present application is intended to be limited solely by the appended claims.

What is claimed is:

1. A preparation method of a high-nickel ternary precursor capable of controlling crystal face preferential growth through an addition amount of seed crystals, comprising the following steps:
    Step 1) adding a ternary metal solution into a reaction kettle containing a first base liquid for a coprecipitation reaction, continuously monitoring a particle size, stopping the feeding when the particle size reaches a D50 of 1.5-3.0 μm, so as to obtain a seed crystal slurry;
    Step 2) simultaneously adding the ternary metal solution, a sodium hydroxide solution and an ammonia solution as parallel flow into a growth kettle containing a second base liquid for a coprecipitation reaction, continuously monitoring a particle size, adding the seed crystal slurry obtained in Step 1 at a constant rate into the reaction system when the D50 of the particle size reaches 6-8 μm, adjusting the feeding rate of the seed crystal slurry to 600-5000 grams per hour (g/h) for controlling the D50 of the particle size at 9.0-11.0 μm, performing the reaction continuously and discharging the product, so as to obtain a high-nickel ternary precursor with crystal face in preferential growth;
    wherein the high nickel ternal precursor comprises a nickel-cobalt-manganese hydroxide and wherein the high nickel ternary precursor is used for preparing a ternary cathode material;
    wherein the ternary metal solution is a nickel-cobalt-manganese ternary mixed salt solution, wherein the nickel-cobalt-manganese ternary mixed salt solution comprises i) 80-85 mol % of nickel ions, ii) 10-15 mol % of cobalt ions, and iii) 3-7 mol % of manganese ions; and
    wherein crystal face preferential growth comprises a peak of indices of crystal face 001 lower than a peak of indices of crystal face 101 in the high-nickel ternary precursor.

2. The preparation method of a high-nickel ternary precursor capable of controlling crystal face preferential growth through an addition amount of seed crystals according to claim 1, wherein, in Step 1, an ammonia concentration of the first base liquid is 4-8 g/L, a temperature of the first base liquid is 40-60° C., and a pH of the first base liquid is 11.0-12.0.

3. The preparation method of a high-nickel ternary precursor capable of controlling crystal face preferential growth through an addition amount of seed crystals according to claim 2, wherein, in Step 1, a feeding rate of the ternary metal solution is 100-300 L/h.

4. The preparation method of a high-nickel ternary precursor capable of controlling crystal face preferential growth through an addition amount of seed crystals according to claim 3, wherein, in Step 1, a stirring rate is 250-350 r/min during the coprecipitation reaction.

5. The preparation method of a high-nickel ternary precursor capable of controlling crystal face preferential growth through an addition amount of seed crystals according to claim 4, wherein, in Step 2, an ammonia concentration of the second base liquid is 4-10 g/L, a temperature of the second base liquid is 40-60° C., and a pH of the second base liquid is 10.5-11.5.

6. The preparation method of a high-nickel ternary precursor capable of controlling crystal face preferential growth through an addition amount of seed crystals according to claim 5, wherein, in Step 2, a feeding rate of the ternary metal solution is 250-300 L/h, a feeding rate of the sodium hydroxide solution is 50-100 L/h, and a flow rate of the ammonia solution is 20-40 L/h.

7. The preparation method of a high-nickel ternary precursor capable of controlling crystal face preferential growth through an addition amount of seed crystals according to claim 6, wherein, in Step 2, a stirring rate is 200-400 r/min during the coprecipitation reaction.

8. The preparation method of a high-nickel ternary precursor capable of controlling crystal face preferential growth through an addition amount of seed crystals according to claim 7, wherein, in Step 2, a content of the seed crystals in the seed crystal slurry added per hour is identical with a solid content of the seed crystals in the seed crystal slurry.

9. The preparation method of a high-nickel ternary precursor capable of controlling crystal face preferential growth through an addition amount of seed crystals according to claim 8, wherein, in Step 2, a mass concentration of sodium hydroxide in the sodium hydroxide solution is 30-32%, and a mass concentration of ammonia in the ammonia solution is 15-25%.

10. The preparation method of a high-nickel ternary precursor capable of controlling crystal face preferential growth through an addition amount of seed crystals according to claim 9, wherein nickel in the high-nickel ternary precursor obtained in Step 2 is 80-85 mol %.

* * * * *